(12) United States Patent
Miskin et al.

(10) Patent No.: US 12,477,634 B2
(45) Date of Patent: Nov. 18, 2025

(54) LED CIRCUITS AND ASSEMBLIES

(71) Applicant: Lynk Labs, Inc., Elgin, IL (US)

(72) Inventors: Michael Miskin, Sleepy Hollow, IL (US); Robert L. Kottritsch, Shefford (GB)

(73) Assignee: Lynk Labs, Inc., Elgin, IL (US)

( * ) Notice: Subject to any disclaimer, the term of this patent is extended or adjusted under 35 U.S.C. 154(b) by 0 days.

(21) Appl. No.: 18/233,724

(22) Filed: Aug. 14, 2023

(65) Prior Publication Data

US 2023/0389156 A1 Nov. 30, 2023

Related U.S. Application Data

(63) Continuation of application No. 17/728,516, filed on Apr. 25, 2022, now Pat. No. 11,729,884, which is a
(Continued)

(51) Int. Cl.
*H05B 45/42* (2020.01)
*H05B 45/37* (2020.01)
*H05B 45/40* (2020.01)

(52) U.S. Cl.
CPC ............. *H05B 45/42* (2020.01); *H05B 45/37* (2020.01); *H05B 45/40* (2020.01); *Y10T 29/49002* (2015.01)

(58) Field of Classification Search
CPC ........ H05B 45/42; H05B 45/37; H05B 45/40; Y10T 29/49002
See application file for complete search history.

(56) References Cited

U.S. PATENT DOCUMENTS 3,582,932 A 6/1971 Chapman
3,821,662 A 6/1974 Dewinter et al.
(Continued)

FOREIGN PATENT DOCUMENTS

AU 2003100206 7/2003
CN 1341966 A 3/2002
(Continued)

OTHER PUBLICATIONS

*Samsung Electronics Co., Ltd. and Samsung Electronics America, Inc.* v. *Lynk Labs, Inc.*, Case No. 1:21-cv-02665, Samsung's Final Unenforcebility and Invalidity Contentions, dated Apr. 1, 2022—52 pages.
(Continued)

*Primary Examiner* — Daniel D Chang
(74) *Attorney, Agent, or Firm* — K&L Gates LLP (57) ABSTRACT

An LED lighting device is disclosed. The LED lighting device includes a first LED circuit and at least one additional LED circuit. The first LED circuit and the at least one additional LED circuit each include LEDs connected in series. The LEDs in the first LED circuit emit a different color of light than the LEDs in the at least one additional LED circuit. The LED lighting device also includes a switch configured to be actuated by an end user and provide the end user with a means to produce a change in brightness of at least one of the first LED circuit or the at least one additional LED circuit, and switch at least one of the first LED circuit and the at least one additional LED circuit on or off.

16 Claims, 5 Drawing Sheets

Related U.S. Application Data continuation of application No. 17/233,891, filed on Apr. 19, 2021, now Pat. No. 11,317,495, which is a continuation of application No. 15/334,001, filed on Oct. 25, 2016, now Pat. No. 10,986,714, which is a continuation-in-part of application No. 14/172,644, filed on Feb. 4, 2014, now Pat. No. 9,750,098, which is a continuation of application No. 13/322,796, filed as application No. PCT/US2010/001597 on May 28, 2010, now Pat. No. 8,648,539, which is a continuation-in-part of application No. 12/287,267, filed on Oct. 6, 2008, now Pat. No. 8,179,055.

(60) Provisional application No. 61/217,215, filed on May 28, 2009, provisional application No. 60/997,771, filed on Oct. 6, 2007.

(56) References Cited

U.S. PATENT DOCUMENTS

| | | |
|---|---|---|
| 3,981,023 A | 9/1976 | King et al. |
| 4,104,562 A | 8/1978 | DiCola |
| 4,271,408 A | 6/1981 | Teshima et al. |
| 4,298,869 A | 11/1981 | Okuno |
| 4,350,973 A | 9/1982 | Petryk, Jr. |
| 4,653,895 A | 3/1987 | Deguchi et al. |
| 4,656,398 A | 4/1987 | Michael et al. |
| 4,780,621 A | 10/1988 | Bartleucci et al. |
| 4,797,651 A | 1/1989 | Havel |
| 4,816,698 A | 3/1989 | Hook |
| RE33,285 E | 7/1990 | Kunen |
| 5,014,052 A | 5/1991 | Obeck |
| 5,086,294 A | 2/1992 | Kasegi |
| 5,278,432 A | 1/1994 | Ignatius et al. |
| 5,324,316 A | 6/1994 | Schulman et al. |
| 5,457,450 A | 10/1995 | Deese et al. |
| 5,469,020 A | 11/1995 | Herrick |
| 5,550,066 A | 8/1996 | Tang et al. |
| 5,621,225 A | 4/1997 | Shieh et al. |
| 5,636,303 A | 6/1997 | Che et al. |
| 5,661,645 A | 8/1997 | Hochstein |
| 5,663,719 A | 9/1997 | Deese et al. |
| 5,739,639 A | 4/1998 | Johnson |
| 5,785,418 A | 7/1998 | Hochstein |
| 5,803,579 A | 9/1998 | Turnbull et al. |
| 5,847,507 A | 12/1998 | Butterworth et al. |
| 5,936,599 A | 8/1999 | Reymond |
| 5,998,925 A | 12/1999 | Shimizu et al. |
| 6,016,038 A | 1/2000 | Mueller |
| 6,019,493 A | 2/2000 | Kuo |
| 6,028,694 A | 2/2000 | Schmidt |
| 6,072,475 A | 6/2000 | van Ketwich |
| 6,078,148 A | 6/2000 | Hochstein |
| 6,127,783 A | 10/2000 | Pashley et al. |
| 6,184,628 B1 | 2/2001 | Ruthenberg |
| 6,227,679 B1 | 5/2001 | Zhang et al. |
| 6,234,648 B1 | 5/2001 | Borner |
| 6,265,984 B1 | 7/2001 | Molinaroli |
| 6,292,901 B1 | 9/2001 | Lys et al. |
| 6,357,889 B1 | 3/2002 | Duggal et al. |
| 6,404,131 B1 | 6/2002 | Kawano et al. |
| 6,412,971 B1 | 7/2002 | Wojnarowski et al. |
| 6,441,558 B1 | 8/2002 | Muthu et al. |
| 6,507,159 B2 | 1/2003 | Muthu |
| 6,528,954 B1 | 3/2003 | Lys et al. |
| 6,541,800 B2 | 4/2003 | Thomas et al. |
| 6,548,967 B1 | 4/2003 | Dowling et al. |
| 6,559,802 B2 | 5/2003 | Goto et al. |
| 6,577,072 B2 | 6/2003 | Saito et al. |
| 6,636,003 B2 | 10/2003 | Rahm et al. |
| 6,636,005 B2 | 10/2003 | Wacyk et al. |
| 6,714,348 B2 | 3/2004 | Dunn |
| 6,722,771 B1 | 4/2004 | Stephens |
| 6,781,329 B2 | 8/2004 | Mueller et al. |
| 6,814,642 B2 | 11/2004 | Siwinski et al. |
| 6,861,658 B2 | 3/2005 | Fiset |
| 6,879,319 B2 | 4/2005 | Cok |
| 7,014,336 B1 | 3/2006 | Ducharme et al. |
| 7,038,399 B2 | 5/2006 | Lys et al. |
| 7,064,498 B2 | 6/2006 | Dowling et al. |
| 7,180,265 B2 | 2/2007 | Naskall et al. |
| 7,202,613 B2 | 4/2007 | Morgan |
| 7,213,940 B1 | 5/2007 | Van De Ven et al. |
| 7,226,442 B2 | 6/2007 | Sheppart, Jr. et al. |
| 7,233,115 B2 * | 6/2007 | Lys ............... H05B 45/10 315/291 |
| 7,262,559 B2 | 8/2007 | Tripathi et al. |
| 7,264,378 B2 | 9/2007 | Loh |
| 7,288,902 B1 | 10/2007 | Melanson |
| 7,344,279 B2 | 3/2008 | Mueller et al. |
| 7,375,476 B2 | 5/2008 | Scott et al. |
| 7,462,997 B2 | 12/2008 | Mueller et al. |
| 7,583,901 B2 | 9/2009 | Nakagawa et al. |
| 7,852,009 B2 | 12/2010 | Coleman et al. |
| 7,888,888 B2 | 2/2011 | Huang et al. |
| 8,080,819 B2 | 12/2011 | Mueller et al. |
| 8,272,757 B1 | 9/2012 | Fan et al. |
| 8,314,571 B2 | 11/2012 | Jonsson |
| 8,362,695 B2 | 1/2013 | Aanegola et al. |
| 8,373,363 B2 | 2/2013 | Zdenko |
| 8,400,081 B2 | 3/2013 | Catalano et al. |
| 8,471,495 B2 | 6/2013 | Muguruma et al. |
| 8,587,205 B2 | 11/2013 | Ter Weeme et al. |
| 9,184,497 B2 | 11/2015 | Chen et al. |
| 9,807,827 B2 | 10/2017 | Miskin et al. |
| 10,091,842 B2 | 10/2018 | Miskin et al. |
| 10,154,551 B2 | 12/2018 | Miskin |
| 10,349,479 B2 | 7/2019 | Miskin et al. |
| 10,492,251 B2 | 11/2019 | Miskin et al. |
| 10,517,149 B2 | 12/2019 | Miskin et al. |
| 10,537,001 B2 | 1/2020 | Miskin et al. |
| 10,757,783 B2 | 8/2020 | Miskin et al. |
| 10,932,341 B2 | 2/2021 | Miskin et al. |
| 2001/0005319 A1 | 6/2001 | Ohishi et al. |
| 2001/0054005 A1 | 12/2001 | Hook et al. |
| 2002/0021573 A1 | 2/2002 | Zhang |
| 2002/0048169 A1 | 4/2002 | Dowling et al. |
| 2002/0048177 A1 | 4/2002 | Rahm et al. |
| 2002/0070914 A1 | 6/2002 | Bruning et al. |
| 2002/0081982 A1 | 6/2002 | Schwartz et al. |
| 2002/0086702 A1 | 7/2002 | Lai et al. |
| 2002/0113244 A1 | 8/2002 | Barnett et al. |
| 2002/0130627 A1 | 9/2002 | Morgan |
| 2002/0145392 A1 | 10/2002 | Hair et al. |
| 2002/0158590 A1 | 10/2002 | Saito et al. |
| 2002/0163006 A1 | 11/2002 | Sundar et al. |
| 2002/0167016 A1 | 11/2002 | Hoelen et al. |
| 2002/0181231 A1 | 12/2002 | Luk |
| 2002/0191029 A1 | 12/2002 | Gillespie et al. |
| 2002/0195968 A1 | 12/2002 | Sanford et al. |
| 2003/0001657 A1 | 1/2003 | Worley |
| 2003/0020629 A1 | 1/2003 | Swartz et al. |
| 2003/0035075 A1 | 2/2003 | Butler et al. |
| 2003/0038291 A1 | 2/2003 | Cao |
| 2003/0063462 A1 | 4/2003 | Shimuzu et al. |
| 2003/0085870 A1 | 5/2003 | Hinckley |
| 2003/0100837 A1 | 5/2003 | Lys et al. |
| 2003/0122502 A1 | 7/2003 | Clauberg et al. |
| 2003/0137258 A1 | 7/2003 | Piepgras et al. |
| 2003/0144034 A1 | 7/2003 | Hack et al. |
| 2003/0156422 A1 | 8/2003 | Tatewaki et al. |
| 2003/0219035 A1 | 11/2003 | Schmidt |
| 2003/0231168 A1 | 12/2003 | Bell et al. |
| 2004/0022058 A1 | 2/2004 | Birrell |
| 2004/0108997 A1 | 6/2004 | Lee |
| 2004/0150994 A1 | 8/2004 | Kazar et al. |
| 2004/0164948 A1 | 8/2004 | Kabel et al. |
| 2004/0207484 A1 | 10/2004 | Forrester et al. |
| 2004/0212321 A1 | 10/2004 | Lys et al. |
| 2004/0218387 A1 | 11/2004 | Gerlach |
| 2004/0252486 A1 * | 12/2004 | Krause ............... H05B 47/175 362/85 |
| 2004/0264193 A1 | 12/2004 | Okumura |

(56) References Cited

U.S. PATENT DOCUMENTS

| | | |
|---|---|---|
| 2005/0111234 A1 | 5/2005 | Martin et al. |
| 2005/0116235 A1 | 6/2005 | Schultz et al. |
| 2005/0128751 A1 | 6/2005 | Roberge et al. |
| 2005/0185401 A1 | 8/2005 | Jiang et al. |
| 2005/0195600 A1 | 9/2005 | Porchia et al. |
| 2005/0231133 A1 | 10/2005 | Lys |
| 2005/0276053 A1 | 12/2005 | Nortrup et al. |
| 2006/0002110 A1* | 1/2006 | Dowling .............. F21V 23/005 362/249.05 |
| 2006/0091415 A1 | 5/2006 | Yan |
| 2006/0163589 A1 | 7/2006 | Fan et al. |
| 2006/0176692 A1 | 8/2006 | Lee et al. |
| 2006/0226795 A1 | 10/2006 | Walter et al. |
| 2006/0238136 A1 | 10/2006 | Johnson, III et al. |
| 2007/0024213 A1 | 2/2007 | Shtenyberg et al. |
| 2007/0171145 A1 | 7/2007 | Coleman et al. |
| 2007/0182338 A1* | 8/2007 | Shteynberg ........ H05B 45/3577 315/200 R |
| 2007/0258231 A1 | 11/2007 | Koerner et al. |
| 2007/0273299 A1 | 11/2007 | Miskin et al. |
| 2007/0290625 A1 | 12/2007 | He |
| 2008/0094005 A1 | 4/2008 | Rabiner et al. |
| 2008/0094837 A1 | 4/2008 | Dobbins et al. |
| 2008/0116818 A1 | 5/2008 | Shteynberg et al. |
| 2008/0218995 A1 | 9/2008 | Gilkey |
| 2008/0252197 A1 | 10/2008 | Li et al. |
| 2009/0017433 A1 | 1/2009 | Belsky et al. |
| 2009/0079362 A1 | 3/2009 | Shteynberg et al. |
| 2009/0160358 A1 | 6/2009 | Slava |
| 2009/0167202 A1 | 7/2009 | Miskin et al. |
| 2009/0174337 A1 | 7/2009 | Miskin et al. |
| 2010/0109564 A1 | 5/2010 | Shin et al. |
| 2010/0134038 A1 | 6/2010 | Shackle |
| 2010/0141177 A1 | 6/2010 | George |
| 2010/0259183 A1 | 10/2010 | Leshniak |
| 2010/0308738 A1 | 12/2010 | Shteynberg et al. |
| 2011/0115407 A1 | 5/2011 | Wibben et al. |
| 2011/0148327 A1 | 6/2011 | Van de Ven et al. |
| 2011/0273098 A1 | 11/2011 | Grajcar |
| 2012/0069560 A1 | 3/2012 | Miskin et al. |
| 2012/0081009 A1 | 4/2012 | Shteynberg et al. |
| 2012/0293083 A1 | 11/2012 | Miskin et al. |
| 2013/0051001 A1 | 2/2013 | Miskin |
| 2014/0153232 A1 | 6/2014 | Miskin et al. |
| 2014/0361697 A1 | 12/2014 | Miskin et al. |
| 2016/0095180 A1 | 3/2016 | Miskin |
| 2016/0143097 A1 | 5/2016 | Miskin |
| 2017/0188426 A1 | 6/2017 | Miskin |
| 2017/0354005 A1 | 12/2017 | Miskin et al. |
| 2019/0182919 A1 | 6/2019 | Miskin et al. |

FOREIGN PATENT DOCUMENTS

| | | |
|---|---|---|
| EP | 0515664 | 12/1992 |
| EP | 1160883 | 12/2001 |
| EP | 1502483 | 2/2005 |
| EP | 1953825 | 8/2008 |
| EP | 1953825 B1 | 7/2013 |
| GB | 2202414 | 9/1988 |
| GB | 2264555 | 9/1993 |
| IL | 123123 | 3/2004 |
| JP | S6230386 | 2/1987 |
| JP | 2000030877 | 1/2000 |
| JP | 2000156526 | 6/2000 |
| JP | 2001004753 A | 1/2001 |
| JP | 2001176677 | 6/2001 |
| JP | 2001284065 | 12/2001 |
| JP | 2002057376 | 2/2002 |
| JP | 2002208301 A | 7/2002 |
| JP | 2001291406 | 4/2003 |
| JP | 2003298118 | 10/2003 |
| JP | 2004111104 | 4/2004 |
| JP | 2005-524960 | 8/2005 |
| JP | 2005222750 | 8/2005 |
| JP | 2007059260 | 3/2007 |
| JP | 3162876 | 9/2010 |
| JP | 2011-040701 | 2/2011 |
| JP | 2011159495 | 8/2011 |
| WO | 9750168 | 12/1997 |
| WO | 1997050168 | 12/1997 |
| WO | 9922338 | 5/1999 |
| WO | 9939319 | 8/1999 |
| WO | 0101385 | 1/2001 |
| WO | 2001001385 | 1/2001 |
| WO | 0215320 | 2/2002 |
| WO | 2002023956 | 3/2002 |
| WO | 0231406 | 4/2002 |
| WO | 02062623 | 8/2002 |
| WO | 2003019072 | 3/2003 |
| WO | 03055273 | 7/2003 |
| WO | 2004094896 | 11/2004 |
| WO | 2005084080 | 9/2005 |
| WO | 2006023149 | 3/2006 |
| WO | 2010016002 | 2/2010 |
| WO | 2010035155 | 4/2010 |
| WO | 2010103480 | 9/2010 |
| WO | 2010126601 | 11/2010 |
| WO | 2010138211 | 12/2010 |
| WO | 20100138211 | 12/2010 |
| WO | 2011082168 | 7/2011 |
| WO | 2011143510 | 11/2011 |
| WO | 20110143510 | 11/2011 |
| WO | 2013026053 | 2/2013 |
| WO | 2013082609 | 6/2013 |

OTHER PUBLICATIONS

*Lynk Labs, Inc., v. Home Depot USA, Inc. The Home Dept Inc., and Home Depot Product Authority, LLC*, Case No. 6:21-cv-00097-ADA, Home Depot's Preliminary Invalidity Contentions And Additional Disclosure Pursuant to Scheduling Order dated Aug. 18, 2021—22 pages.
U.S. Pat. No. 10,492,251 ('251 Patent)—Exhibit A-01—Takeo '301.
U.S. Pat. No. 10,492,251 ('251 Patent)—Exhibit A-02—Lynam '623.
U.S. Pat. No. 10,492,251 ('251 Patent)—Exhibit A-03—Filipovsky '319.
U.S. Pat. No. 10,492,251 ('251 Patent)—Exhibit A-04 Deese '719.
U.S. Pat. No. 10,492,251 ('251 Patent)—Exhibit A-05 Okuno.
U.S. Pat. No. 10,492,251 ('251 Patent)—Exhibit A-06—Ohishi '319.
U.S. Pat. No. 10,492,251 ('251 Patent)—Exhibit A-07 Teshima.
U.S. Pat. No. 10,349,479 ("'479 Patent")—Exhibit B-01 Dowling.
U.S. Pat. No. 10,349,479 ("'479 Patent")—B-02 Ter Weeme.
U.S. Pat. No. 10,349,479 ("'479 Patent")—Exhibit B-03 Lin.
U.S. Pat. No. 10,349,479 ("'479 Patent")—Exhibit B-04 Lys '483.
U.S. Pat. No. 10,349,479 ("'479 Patent")—Exhibit B-05 Leong '814.
U.S. Pat. No. 10,349,479 ("'479 Patent")—Exhibit B-06 Calon.
U.S. Pat. No. 10,349,479 ("'479 Patent")—Exhibit B-07 Nakagawara.
U.S. Pat. No. 10,757,783 ("'783 Patent")—Exhibit C-01 Grajcar.
U.S. Pat. No. 10,757,783 ("'783 Patent")—Exhibit C-02 Reymond.
U.S. Pat. No. 10,757,783 ("'783 Patent")—Exhibit C-03 Walter.
U.S. Pat. No. 10,757,783 ("'783 Patent")—Exhibit C-04 Lyos '901.
U.S. Pat. No. 10,757,783 ("'783 Patent")—Exhibit C-05 Hair.
U.S. Pat. No. 10,757,783 ("'783 Patent")—Exhibit C-06 Cho.
U.S. Pat. No. 10,757,783 ("'783 Patent")—Exhibit C-07 Coleman.
U.S. Pat. No. 10,757,783 ("'783 Patent")—Exhibit C-08 Shimizu.
U.S. Pat. No. 10,154,551 ("'551 Patent")—Exhibit D-01 Saito.
U.S. Pat. No. 10,154,551 ("'551 Patent")—Exhibit D-02 Hochstein '168.
U.S. Pat. No. 10,154,551 ("'551 Patent")—Exhibit D-03 Reymond.
U.S. Pat. No. 10,154,551 ("'551 Patent")—Exhibit D-04 Panagotacos.
U.S. Pat. No. 10,154,551 ("'551 Patent")—Exhibit D-05 Liu.
U.S. Pat. No. 10,154,551 ("'551 Patent")—Exhibit D-06 Deese 450.
U.S. Pat. No. 10,154,551 ("'551 Patent")—Exhibit D-07 Lys.
U.S. Pat. No. 10,154,551 ("'551 Patent")—Exhibit D-08 Shimizu.

(56) References Cited

OTHER PUBLICATIONS

U.S. Pat. No. 10,517,149 ("'149 Patent")—Exhibit E-01 Takahashi.
U.S. Pat. No. 10,517,149 ("'149 Patent")—Exhibit E-02 Saito '590.
U.S. Pat. No. 10,517,149 ("'149 Patent")—Exhibit E-03 Lys '399.
U.S. Pat. No. 10,517,149 ("'149 Patent")—Exhibit E-04 Catalano '081.
U.S. Pat. No. 10,517,149 ("'149 Patent")—Exhibit E-05 Deese '719.
U.S. Pat. No. 10,652,979 ("'979 Patent")—Exhibit F-01 Coats '555.
U.S. Pat. No. 10,652,979 ("'979 Patent")—Exhibit F-02 Birrell '406.
U.S. Pat. No. 10,652,979 ("'979 Patent")—Exhibit F-03 Muthu '159.
U.S. Pat. No. 10,652,979 ("'979 Patent")—Exhibit F-04 Teshima '408.
U.S. Pat. No. 10,652,979 ("'979 Patent")—Exhibit F-05 Takeo.
U.S. Pat. No. 10,652,979 ("'979 Patent")—Exhibit F-06 Deese '719.
U.S. Appl. No. 60/839,453, filed Aug. 23, 2006, entitled "Lighting Device and Lighting Method" to Van de Ven and Negley, ("453 Provisional").
U.S. Appl. No. 60/793,524, filed Apr. 20, 2006, entitled "Lighting Device and Lighting Method" to Van de Ven and Negley, ("524 Provisional").
U.S. Appl. No. 60/844,325, filed Sep. 13, 2006, entitled "Boost/Flyback Power Supply Topology With Low Side Mosfet Current Control" to Myers ("Myers").
Interim LED Purchase Specifications of the Institute of Transportation Engineers, Jul. 1998 ("1998 Specification").
"Comparison of Control Options in Private Offices in an Advanced Lighting Controls Testbed," by Judith D. Jennings et al., and published in Apr. 1999 ("Jennings").
Vehicle Detection Using a Magetic Field Sensor, by Stanely V. Marshall, and published in May 1978 ("Marshall").
*Home Depot U.S.A., Inc.*, v. *Lynk Labs, Inc.*, U.S. Pat. No. 10,932,341, Filing Date: Jan. 10, 2020, Issue Date: Feb. 23, 2021—PGR2022-00009; Declaration of Dr. Dean Neikirk U.S. Pat. No. 10,932,341, 140 pages—Ex. 1002.
*Home Depot U.S.A., Inc.*, v. *Lynk Labs, Inc.*, U.S. Pat. No. 10,932,341, Filing Date: Jan. 10, 2020, Issue Date: Feb. 23, 2021—PGR2022-00009; Petition for Post Grant Review of U.S. Pat. No. 10,932,341, 94 pages.
U.S. Appl. No. 16/740,295, filed Jan. 10, 2020 (Part 1) 768 pages—Ex. 1003.
U.S. Appl. No. 16/740,295, filed Jan. 10, 2020 (Part 2) 466 pages—Ex. 1003.
*Lynk Labs, Inc.*, v. *Home Depot USA, Inc., The Home Depot Inc., and Home Depot Product Authority, LLC*, Case No. 6:21-cv-00097, Complaint for Patent Infringement dated Jan. 29, 2021—Ex. 1011.
*Lynk Labs, Inc.*, v. *Home Depot USA, Inc., The Home Depot Inc., and Home Depot Product Authority, LLC*, Case No. 6:21-cv-00097-ADA, Plaintiff Lynk Labs, Inc.'s Amended Preliminary Infringement Contentions, dated Jun. 23, 2021, 241 pages—Ex. 1012.
*Lynk Labs, Inc.*, v. *Home Depot USA, Inc., The Home Depot Inc., and Home Depot Product Authority, LLC*, Case No. 6:21-cv-00097-ADA, Scheduling Order filed Aug. 13, 2021, 4 pages—Ex. 1013.
U.S. Appl. No. 61/217,215, filed May 28, 2009, 32 pages—Ex. 1014.
U.S. Appl. No. 60/997,771, filed Oct. 6, 2007, 24 pages—Ex. 1015.
*Lynk Labs, Inc.*, v. *Home Depot USA, Inc., The Home Depot Inc., and Home Depot Product Authority, LLC*, Case No. 6:21-cv-00097-ADA, Defendants' Opening Claim Construction Brief on the Terms of U.S. Pat. Nos. 10,091,842, 10,154,551, 10,349,479, 10,492,251, 10,517,149, 10,537,001, 10,652,979, 10,757,783, and 10,932,341 filed Oct. 6, 2021, 38 pages—Ex. 1021.
*Lynk Labs, Inc.*, v. *Home Depot USA, Inc., The Home Depot Inc., and Home Depot Product Authority, LLC*, Case No. 6:21-cv-00097-ADA, Plaintiff Lynk Labs, Inc.'s Responsive Claim Construction Brief filed Oct. 27, 2021, 47 pages—Ex. 1022.

Application Multi-Voltage and Multi-Brightness LED Lighting Devices And Methods Of Using Same, Remarks filed Jun. 13, 2019 12 pages—Ex. 1023.
U.S. Appl. No. 15/369,218 Non-Final Office Action dated Oct. 2, 2018—Ex. 1024.
Response to Office Action U.S. Appl. No. 16/440,884, filed Aug. 22, 2019, 11 pages—Ex. 1026.
IEEE 100 The Authoritative Dictionary of IEEE Standards Terms Seventh Edition, Published by Standards Information Network IEEE Press, 3 pages—Ex. 1028.
Response to Office Action U.S. Appl. No. 16/440,884, filed Jun. 16, 2020, 8 pages—Ex. 1029.
*Home Depot USA, Inc.*, v. *Lynk Labs, Inc.*, Case PGR2022-00009, U.S. Pat. No. 10,932,341, Patent Owner's Mandatory Notices Pursuant to 37 C.F.R. Section 42.8 dated Nov. 19, 2021, 5 pages.
*Home Depot USA, Inc.*, v. *Lynk Labs, Inc.*, Case PGR2022-00009, U.S. Pat. No. 10,932,341, Issue Date Feb. 23, 2021, Petitioner's Power of Attorney dated Nov. 5, 2021, 2 pages.
*Home Depot USA, Inc.*, v. *Lynk Labs, Inc.*, U.S. Pat. No. 10,932,341, Filing Date: Jan. 10, 2020, Issue Date: Feb. 23, 2021, IPR 2022-00143, Petition for Inter Partes Review of U.S. Pat. No. 10,932,341 dated Nov. 24, 2021, 81 pages.
*Samsung Electronics Co., Ltd.*, Petitioner v. *Lynk Labs, Inc.* Patent Owner IPR 2021-01347, U.S. Pat. No. 10,966,298 B2; Judgment Final Written Decision Determining All Challenged Claims Unpatentable 35 USC Section 318(a) dated Mar. 13, 2023 Paper 27—57 pages.
*Samsung Electronics Co., Ltd.*, Petitioner v. *Lynk Labs, Inc.* Patent Owner IPR 2021-01345, U.S. Pat. No. 10,492,252 B2; Decision Final Written Decision Determining All Challenged Claims Unpatentable 35 USC Section 318(a) dated Mar. 15, 2023 Paper 28—50 pages.
*Samsung Electronics Co., Ltd.*, Petitioner v. *Lynk Labs, Inc.* Patent Owner IPR 2021-01346, U.S. Pat. No. 10,499,466 B1; Decision Final Written Decision Determining All Challenged Claims Unpatentable 35 USC Section 318(a) dated Mar. 15, 2023 Paper 29—64 pages.
*Samsung Electronics Co., Ltd.*, Petitioner v. *Lynk Labs, Inc.* Patent Owner IPR 2021-01576, U.S. Pat. No. 10,652,979 B2; Judgment Final Written Decision Determining All Challenged Claims Unpatentable 35 USC Section 318(a) dated Apr. 19, 2023 Paper 34—57 pages.
*Samsung Electronics Co., Ltd.*, Petitioner v. *Lynk Labs, Inc.* Patent Owner IPR 2021-01300, U.S. Pat. No. 11,019,697 B2; Judgment Final Written Decision Determining All Challenged Claims Unpatentable 35 USC Section 318(a) dated Mar. 13, 2023 Paper 35—54 pages.
*Home Depot USA, Inc.*, Petitioner v. *Lynk Labs, Inc.* Patent Owner IPR 2021-01540, U.S. Pat. No. 10,091,842 B2; Judgment Final Written Decision Determining All Challenged Claims Unpatentable 35 USC Section 318(a) dated Mar. 29, 2023 Paper 46—31 pages.
*Home Depot USA, Inc.*, Petitioner v. *Lynk Labs, Inc.* Patent Owner IPR 2021-01541, U.S. Pat. No. 10,537,001 B2; Judgment Final Written Decision Determining All Challenged Claims Unpatentable 35 USC Section 318(a) dated Apr. 26, 2023 Paper 39—40 pages.
*Home Depot USA, Inc.*, Petitioner v. *Lynk Labs, Inc.* Patent Owner IPR 2022-00023, U.S. Pat. No. 10,517,149 B2; Judgment Final Written Decision Determining Some Challenged Claims Unpatentable 35 USC Section 318(a) dated May 5, 2023 Paper 40—55 pages.
*Samsung Electronics Co., Ltd.*, Petitioner v. *Lynk Labs, Inc.* Patent Owner IPR 2022-00098, U.S. Pat. No. 10,517,149 B2 Judgment Final Written Decision Determining Some Challenged Claims Unpatentable 35 USC Section 318(a) dated May 5, 2023 Paper 29—46 pages.
Petition for Inter Partes Review, *Home Depot USA, Inc.*, Petitioner, v. *Lynk Labs, Inc.*, Patent Owner, Case IPR2021-01370 U.S. Pat. No. 10,349,479, Issue Date Jul. 9, 2019, Title: "Color Temperature Controlled and Low THD LED Lighting Devices and Systems and Methods of Driving the Same," 52 pages dated Aug. 18, 2021.
Petitioners' Power of Attorney, *Home Depot USA, Inc.*, Petitioner, v. *Lynk Labs, Inc.*, Patent Owner, Case IPR2021-01370 U.S. Pat. No. 10,349,479, Issue Date Jul. 9, 2019, Title: "Color Temperature Controlled and Low THD LED Lighting Devices and Systems and Methods of Driving the Same," 2 pages dated Aug. 17, 2021.

(56) References Cited

OTHER PUBLICATIONS

Declaration of Dr. Dean Neikirk U.S. Pat. No. 10,349,479, Inter Partes Review No. IPR2021-01370, 98 pages—Ex 1002.
U.S. Appl. No. 15/369,218, filed Dec. 5, 2016, 617 pages—Ex 1003.
U.S. Appl. No. 61/630,025, filed Dec. 2, 2011, 39 pages—Ex 1011.
U.S. Appl. No. 61/570,200, filed Dec. 13, 2011, 51 pages—Ex 1012.
Complaint for Patent Infringement, Case No. 6:21-cv-00097, *Lynk Labs, Inc.* v. *Home Depot USA, Inc., The Home Depot Inc., and Home Depot Product Authority, LLC*, dated Jan. 29, 2021, 88 pages—Ex 1014.
Plaintiff Amended Preliminary Infringement Contentions, Lynk Lab's, Inc.'s, Case No. 6:21-cv-00097-ADA, *Lynk Labs, Inc.* v. *Home Depot USA, Inc., The Home Depot Inc., and Home Depot Product Authority, LLC*, dated Jun. 23, 2021, 7 pages—Ex 1015.
Scheduling Order, Case No. 6:21-cv-00097-ADA, *Lynk Labs, Inc.* v. *Home Depot USA, Inc., The Home Depot Inc., and Home Depot Product Authority, LLC*, filed Aug. 13, 2021, 4 pages—Ex 1016.
*Home Depot U.S.A., Inc.* v. *Lynk Labs, Inc.* Case IPR 2022-00023 U.S. Pat. No. 10,517,149, Issue Date Dec. 24, 2019, Declaration of Dr. Lebby dated Oct. 20, 2021, 157 pages—Ex. 1002.
*Lynk Labs, Inc.*, v. *Home Depot USA, Inc., The Home Dept Inc., and Home Depot Product Authority, LLC* Case No. 6:21-cv-00097-ADA Scheduling Order filed Aug. 13, 2021, 4 pages—Ex. 1003.
*Lynk Labs, Inc.*, v. *Home Depot USA, Inc., The Home Dept Inc., and Home Depot Product Authority, LLC* Case No. 6:21-cv-00097 Complaint for Patent Infringement dated Jan. 29, 2021, 88 pages—Ex. 1004.
*Lynk Labs, Inc.*, v. *Home Depot USA, Inc., The Home Dept Inc., and Home Depot Product Authority, LLC* Case No. 6:21-cv-00097-ADA Plaintiff Lynk Labs, Inc,'s Amended Preliminary Infringement Contentions '149 Patent dated Jun. 23, 2021, 154 pages—Ex. 1005.
U.S. Appl. No. 16/215,502, filed Dec. 10, 2018, 359 pages—Ex. 1006.
IEEE 100 The Authoritative Dictionary of IEEE Standards Terms, Seventh Edition, Published by Standards Informaiton Network IEEE Press, pp. 1-4—Ex. 1007.
*Lynk Labs, Inc.* v. *Home Depot USA, Inc., The Home Dept Inc., and Home Depot Product Authority, LLC* Case No. 6:21-cv-00097-ADA Defendants' Opening Claim Construction Brief on the Terms of U.S. Pat. Nos. 10,091,842, 10,154,551, 10,349,479, 10,492,251, 10,517,149, 10,537,001, 10,652,979, 10,757,783 and 10,932,341 filed Oct. 6, 2021, 38 pages—Ex. 1015.
U.S. Appl. No. 16/274,164, filed Feb. 12, 2019, 543 pages—Ex. 1016.
Heat Sink, Merriam-Webster; Examples of heat sink in a sentence, http://wwwmerriam-webster.com/dictionary/heat%20sink, 7 pages—Ex. 1017.
Insulator, Britannica Online Encyclopedia Full Article, http://www.britannica.com/print/article/289459, 2 pages—Ex. 1018.
*Home Depot USA, Inc.*, v. *Lynk Labs, Inc.* Case IPR2022-00023 U.S. Pat. No. 10,517,149 Issue Date Dec. 24, 2019, Petition for Inter Partes Review dated Oct. 20, 2021, 74 pages.
*Home Depot USA, Inc.*, v. *Lynk Labs, Inc.* Case IPR2022-00023 U.S. Pat. No. 10,517,149 Issue Date Dec. 24, 2019, Petitioner's Power of Attorney dated Oct. 20, 2021, 2 pages.
*Home Depot USA, Inc.*, v. *Lynk Labs, Inc.* Case IPR2022-00023 U.S. Pat. No. 10,517,149 Issue Date Dec. 24, 2019, Patent Owner's Mandatory Notices Pursuant to 37 C.F.R. Section 42.8 dated Nov. 10, 2021, 5 pages.
U.S. Pat. No. 10,091,842 ("'842 Patent")—Exhibit G-01 Bruning.
U.S. Pat. No. 10,091,842 ("'842 Patent")—Exhibit G-02 Ohishi '319.
U.S. Pat. No. 10,091,842 ("'842 Patent")—Exhibit G-03 Ruxton.
U.S. Pat. No. 10,091,842 ("'842 Patent")—Exhibit G-04 Walding.
U.S. Pat. No. 10,091,842 ("'842 Patent")—Exhibit G-05 Bohn.
U.S. Pat. No. 10,091,842 ("'842 Patent")—Exhibit G-06 Dowling.
U.S. Pat. No. 10,537,001 ("'001 Patent")—Exhibit H-01 Dowling.
U.S. Pat. No. 10,537,001 ("'001 Patent")—Exhibit H-02 Lys '321.
U.S. Pat. No. 10,537,001 ("'001 Patent")—Exhibit H-03 Miskin.
U.S. Pat. No. 10,537,001 ("'001 Patent")—Exhibit H-04 Leong '003.
U.S. Pat. No. 10,537,001 ("'001 Patent")—Exhibit H-05 Konno.
U.S. Pat. No. 10,932,341 ("'341 Patent")—Exhibit I-01 Ohishi '009.
U.S. Pat. No. 10,932,341 ("'341 Patent")—Exhibit I-02 Muthu '558.
U.S. Pat. No. 10,932,341 ("'341 Patent")—Exhibit I-03 Dowling.
U.S. Pat. No. 10,932,341 ("'341 Patent")—Exhibit I-04 Konno.
U.S. Pat. No. 10,932,341 ("'341 Patent")—Exhibit I-05 Leong '003.
U.S. Pat. No. 10,932,341 ("'341 Patent")—Exhibit I-06 Reymond.
"White Light Emitting Diode Development for General Illumination Applications" to James Ibbetson, published on May 1, 2006 ("Ibbetson").
*Home Depot USA, Inc.*, v. *Lynk Labs, Inc.* Case IPR2021-01540, U.S. Pat. No. 10,091,842—Declaration of Dr. Lebby; Issue Date Oct. 2, 2018—158 pages—Ex. 1002.
U.S. Appl. No. 15/334,029, filed Oct. 25, 2016—646 pages—Ex. 1003.
*Lynk Labs, Inc.* v. *Home Depot USA, Inc., The Home Depot Inc. and Home Depot Product Authority, LLC*, Case No. 6:21-cv-00097-ADA, Complaint for Patent Infringement filed Jan. 29, 2021—88 pages—Ex. 1004.
*Lynk Labs, Inc.* v. *Home Depot USA, Inc., The Home Depot Inc. and Home Depot Product Authority, LLC*, Case No. 6:21-cv-00097-ADA, Scheduling Order filed Aug. 13, 2021—4 pages—Ex. 1006.
Signalized Intersection Safety in Europe, Dec. 2003, Publication No. FHWA-PL-02-020, Office of International Programs; International@fhwa.dot.gov;www.international.fhwa.dot.gov—126 pages—Ex. 1010.
Ohno et al., "Traffic Light Queues with Departure Headway Depending Upon Positions," Kyoto University, J. Operations Research So. of Japan, vol. 17, No. 3, Sep. 1974—pp. 146-169—Ex. 1011.
U.S. Appl. No. 61/333,963, filed May 12, 2010—52 pages—Ex. 1021.
U.S. Appl. No. 61/284,927, filed Dec. 28, 2009—26 pages—Ex. 1022.
U.S. Appl. No. 61/335,069, filed Dec. 31, 2009—36 pages—Ex. 1023.
U.S. Appl. No. 60/997,771, filed Oct. 6, 2007—24 pages—Ex. 1024.
U.S. Appl. No. 60/547,653, filed Feb. 25, 2004—83 pages—Ex. 1025.
U.S. Appl. No. 60/559,867, filed Feb. 25, 2004—89 pages—Ex. 1026.
U.S. Appl. No. 61/217,215, filed May 28, 2009—32 pages—Ex. 1027.
U.S. Appl. No. 61/215,144, filed May 1, 2009—11 pages—Ex. 1028.
E. Fred Schubert, "Light Emitting Diodes," Rensselaer Polytechnic Institute, Cambridge University Press, 2002—327 page—Ex. 1030.
IEEE 100 The Authoritative Dictionary of IEEE Standards Terms, Seventh Edition—4 pages—Ex. 1032.
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 264 pages—Ex. 1005 (excerpts).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 100 pages—Ex. 1012 (Part 1).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 102 pages—Ex. 1012 (Part 2).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 102 pages—Ex. 1012 (Part 3).
*Lynk Labs, Inc.* v. *Home Depot USA, Inc., The Home Depot Inc. and Home Depot Product Authority, LLC*, Case No. 6:21-cv-00097-

(56) References Cited

OTHER PUBLICATIONS

ADA, Preliminary Lynk Labs, Inc.'s Amended Preliminary Infringement Contentions filed Jun. 23, 2021, 142 pages—Ex. 1012 (Part 4).
*Home Depot USA, Inc.*, v. *Lynk Labs, Inc.*, Case No. IPR2021-01540, U.S. Pat. No. 10,091,842, Petition for Inter Partes Review, Issue Date Oct. 2, 2018—74 pages.
*Home Depot USA, Inc.*, v. *Lynk Labs, Inc.*, Case No. IPR2021-01540, U.S. Pat. No. 10,091,842, Notice of Filing Date Accorded to Petition and Time for Filing Patent Owner Preliminary Response—mailed Oct. 15, 2021—6 pages.
*Home Depot USA, Inc.*, v. *Lynk Labs, Inc.*, Case No. IPR2021-01540, U.S. Pat. No. 10,091,842, Petitioner's Power of Attorney, Issue Date Oct. 2, 2018—2 pages.
*Home Depot USA, Inc.*, v. *Lynk Labs, Inc.*, Case No. IPR2021-01540, U.S. Pat. No. 10,091,842, Patent Owner's Mandatory Notices Pursuant to 37 C.F.R. Section 42.8 filed Oct. 22, 2021—6 pages.
*Home Depot USA, Inc.*, v. *Lynk Labs, Inc.*, Case No. IPR2021-01541, U.S. Pat. No. 10,537,001, Declaration of Dr. Dena Neikirk, Filing Date Feb. 12, 2019, Issue Date Jan. 14, 2020.
U.S. Appl. 16/274,164, filed Feb. 12, 2019—543 pages—Ex. 1003.
*Lynk Labs, Inc.*, v. *Home Depot USA, Inc., The Home Depot Inc., and Home Depot Product Authority, LLC*, Case No. 6:21-cv-00097, Complaint for Patent Infringement Case dated Jan. 29, 2021—88 pages—Ex. 1011.
*Lynk Labs, Inc.*, v. *Home Depot USA, Inc., The Home Depot Inc., and Home Depot Product Authority, LLC*, Case No. 6:21-cv-00097-ADA, Defendants' Opening Claim Construction Brief on the Terms of U.S. Pat. Nos. 10,091,842, 10,154,551, 10,349,479, 10,492,251, 10,517,149, 10,537,001, 10,562,979, 10,757,783, and 10,932,341 filed Oct. 6, 2021—38 pages—Ex. 1019.
Response to Final Office Action U.S. Appl. No. 15/369,218, filed Jun. 13, 2018, 10 pages—Ex. 1020.
Non-Final Office Action U.S. Appl. No. 156/369,218 dated Oct. 2, 2018, 11 pages—Ex. 1021.
Non-Final Office Action U.S. Appl. No. 16/440,884 dated Jul. 23, 2019, 10 pages—Ex. 1023.
Continuation U.S. Appl. No. 16/369,218—original claims—Ex. 1024.
Response to Office Action U.S. Appl. No. 16/440,884, 11 pages—Ex. 1026.
*Home Depot USA, Inc.*, v. *Lynk Labs, Inc.*, Case No. IPR2021-01541, Filing Date Feb. 12, 2019, Issue Date Jan. 14, 2020, Petition for Inter Partes Review of U.S. Pat. No. 10,537,001 Under 35 U.S.C. Section 311-319 and 37 C.F.R. Section 42.1-100, et Seq., 82 pages.
*Home Depot USA, Inc.*, v. *Lynk Labs, Inc.*, Case No. IPR2021-01541, U.S. Pat. No. 10,537,001, Petitioner's Power of Attorney, Issue Date Jan. 14, 2020—2 pages.
*Home Depot USA, Inc.*, v. *Lynk Labs, Inc.*, Case No. IPR2021-01541, U.S. Pat. No. 10,537,001, Patent Owner's Mandatory Notices Pursuant to 37 C.F.R. Section 42.8 filed Nov. 10, 2021—6 pages.
Petition for Inter Partes Review, *Home Depot USA, Inc.*, Petitioner, v. *Lynk Labs, Inc.*, Patent Owner, Case IPR2021-001367 U.S. Pat. No. 10,154,551, Issue Date Dec. 11, 2018, Title: "AC Light Emitting Diode and AC LED Drive Methods and Apparatus," 93 pages dated Aug. 18, 2021.
Petitioners' Power of Attorney, *Home Depot USA, Inc.*, Petitioner, v. *Lynk Labs, Inc.*, Patent Owner, Case IPR2021-001367 U.S. Pat. No. 10,154,551, Issue Date Dec. 11, 2018, Title: "AC Light Emitting Diode and AC LED Drive Methods and Apparatus," 2 pages dated Aug. 17, 2021.
Declaration of Dr. Dean Neikirk—U.S. Pat. No. 10,154,551, Claims 1, 3, 4, 5, 7, 8—141 pages—Ex 1002.
U.S. Appl. No. 15/797,806—Now U.S. Pat. No. 10,154,551—Ex 1003.
U.S. Appl. No. 11/066,414—Now U.S. Pat. No. 7,489,086 issued Feb. 10, 2009—Ex 1005.
IEEE 100, The Authoritative Dictionary of IEEE Standards Terms—Seventh Edition, 3 pages—Ex 1010.

Complaint for Patent Infringement *Lynk Labs, Inc.* Plaintiff v. *Home Depot USA, Inc., The Home Depot Inc., and Home Depot Product Authority, LLC* Defendants, Case No. 6:21-cv-00097, filed Jan. 20, 2021—Ex. 1011.
Azazi et al., "Review of Passive and Active Circuits for Power Factor Correction in Single Phase, Low Power AC-DC Converters," Proceedings of the 14th International Middle East Power Systems Conference (MEPCON'10) Cairo University, Egypt, Dec. 19-21, 2010, Paper ID 154, 8 pages—Ex 1016.
U.S. Appl. No. 60/547,653, filed Feb. 25, 2004—Ex 1017.
U.S. Appl. No. 60/559,867, filed Feb. 25, 2004—Ex 1018.
U.S. Appl. No. 60/997,771, filed Oct. 6, 2007—Ex 1019.
U.S. Appl. No. 61/215,144, filed May 1, 2009—Ex 1022.
U.S. Appl. No. 61/217,215, filed May 28, 2009—Ex 1023.
U.S. Appl. No. 61/284,927, filed Dec. 28, 2009—Ex 1024.
U.S. Appl. No. 61/335,069, filed Dec. 31, 2009—Ex 1025.
U.S. Appl. No. 61/333,963, filed May 12, 2010—Ex 1026.
Plaintiff Lynk Labs, Inc.'s Amended Preliminary Infringement Contentions, Case No. 6:21-cv-00097-ADA filed Jun. 23, 2021, 7 pages—Ex 1034.
U.S. Appl. No. 60/379,079, filed May 9, 2002—Ex 1035.
U.S. Appl. No. 60/391,627, filed Jun. 26, 2002—Ex 1036.
Institute of Transportation Engineers Publication No. ST-017B, 1997 ISBN: 0-935403-16-7, ITE Specification (183369415.1), Chapter 2 Vehicle Traffic Control Signal Heads, 25 pages—Ex 1038.
Osorno, "Fourier Analysis of a Single-Phase Full Bridge Rectifier Using Matlab," California State University Northridge, 2002-774, 9 pages—Ex 1039.
Scheduling Order *Lynk Labs, Inc.* Plaintiff v. *Home Depot USA, Inc., The Home Depot Inc., and Home Depot Product Authority, LLC* Defendants, Case No. 6:21-cv-00097, filed Aug. 13, 2021—Ex. 1040.
Vachak et al., "Power Factor Correction Circuits: Active Filters," International Journal of Engineering Research and General Science, vol. 2, Issue 5, Aug.-Sep. 2014, ISSAN 2091-2730, 9 pages—Ex 1041.
Petition for Inter Partes Review, *Home Depot USA, Inc.*, Petitioner, v. *Lynk Labs, Inc.*, Patent Owner, Case IPR2021-01369 U.S. Pat. No. 10,492,251, Issue Date Nov. 26, 2019, Title: "AC Light Emitting Diode and AC LED Drive Methods and Apparatus," 53 pages dated Aug. 18, 2021.
Petitioners' Power of Attorney, *Home Depot USA, Inc.*, Petitioner, v. *Lynk Labs, Inc.*, Patent Owner, Case IPR2021-01369 U.S. Pat. No. 10,492,251, Issue Date Nov. 26, 2019, Title: "AC Light Emitting Diode and AC LED Drive Methods and Apparatus," 53 pages dated Aug. 17, 2021.
Declaration of Dr. Lebby U.S. Pat. No. 10,492,251 dated Aug. 18, 2021, 134 pages—Ex 1002.
U.S. Appl. No. 16/148,945, filed Oct. 1, 2018—Ex. 1003.
Complaint for Patent Infringement, *Lynk Labs, Inc.* v. *Home Depot USA, Inc., The Home Depot Inc., and Home Depot Product Authority, LLC*, Case No. 6:21-cv-00097 dated Jan. 29, 2021, 88 pages—Ex. 1010.
Plaintiff Lynk Labs, Inc.'s Amended Preliminary Infringement Contentions, *Lynk Labs, Inc.* v. *Home Depot USA, Inc., The Home Depot Inc., and Home Depot Product Authority, LLC*, Case No. 6:21-cv-00097-ADA, dated Jun. 23, 2021, 7 pages—Ex. 1011.
Scheduling Order, *Lynk Labs, Inc.* v. *Home Depot USA, Inc., The Home Depot Inc., and Home Depot Product Authority, LLC*, Case No. 6:21-cv-00097-ADA, filed Aug. 13, 2021, 4 pages—Ex. 1012.
Petition for Inter Partes Review, *Home Depot USA, Inc.*, Petitioner, v. *Lynk Labs, Inc.*, Patent Owner, Case IPR2021-001368 U.S. Pat. No. 10,757,783, Issue Date Aug. 25, 2020, Title: "Color Temperature Controlled and Low THD LED Lighting Devices and Driving the Same," 95 pages dated Aug. 18, 2021.
Petitioners' Power of Attorney, *Home Depot USA, Inc.*, Petitioner, v. *Lynk Labs, Inc.*, Patent Owner, Case IPR2021-001368 U.S. Pat. No. 10,757,783, Issue Date Aug. 25, 2020, Title: "Color Temperature Controlled and Low THD LED Lighting Devices and Driving the Same," 2 pages dated Aug. 17, 2021.
Declaration of Dr. Lebby U.S. Pat. No. 10,757,783 dated Aug. 18, 2021, 187 pages—Ex 1002.

(56) References Cited

OTHER PUBLICATIONS

U.S. Appl. No. 16/440,884, filed Jun. 13, 2019, 341 pages—Ex 1003.
Institute of Transportation Engineers, Publication No. ST-017B 300/IG/102, ISBN 0-935403-16-7 (1998), 25 pages—Ex 1007.
Complaint for Patent Infringement *Lynk Labs, Inc. v. Home Depot USA Inc., The Home Depot Inc., and Home Depot Product Authority, LLC*, Case No. 6:21-cv-00097, filed Jan. 29, 2021, 86 pages—Ex. 1010.
U.S. Appl. No. 61/630,025, filed Dec. 2, 2011, 39 pages—Ex 1012.
U.S. Appl. No. 61/570,200, filed Dec. 13, 2011, 51 pages—Ex 1013.
Plaintiff Lynk Labs, Inc.'s Amended Preliminary Infringement Contentions, Case No. 6:21-cv-00097-ADA, dated Jun. 23, 2021, 7 pages—Ex 1019.
Okon et al., "The First Practical LED", 14 pages—Ex 1020.
Scheduling Order, Case No. 6:21-cv-00097-ADA filed Aug. 13, 2021, 4 pages—Ex 1021.
U.S. Appl. No. 61/233,829, filed Aug. 14, 2009, 36 pages—Ex 1022.
*Lynk Labs, Inc. v. Home Depot USA, Inc. The Home Depot, Inc., and Home Depot Product Authority, LLC*, Case No. 6:21-cv-00097-ADA, Defendants' Corrected Reply Claim Construction Brief on the Terms of U.S. Pat. Nos. 10,091,842, 10,154,551, 10,349,479, 10,492,251,10,517,149, 10,537,001, 10,652,979, 10,757,783, and 10,932,341 filed Nov. 10, 2021—60 pages.
*Lynk Labs, Inc. v. Home Depot USA, Inc. The Home Depot, Inc., and Home Depot Product Authority, LLC*, Case No. 6:21-cv-00097-ADA, Plaintiff Lynk Labs, Inc.'s Responsive Claim Construction Brief filed Oct. 27, 2021, Part 1.
*Lynk Labs, Inc. v. Home Depot USA, Inc. The Home Depot, Inc., and Home Depot Product Authority, LLC*, Case No. 6:21-cv-00097-ADA, Plaintiff Lynk Labs, Inc.'s Responsive Claim Construction Brief filed Oct. 27, 2021, Part 2.
*Samsung Electronics Co. Ltd.*, Petitioner v. *Lynk Labs, Inc.*, Patent Owner IPR2021-01575, U.S. Pat. 10,154,551 B2, Judgment Final Written Decision Determining All Challenged Claims Unpatentable 35 U.S.C. Section 318(a)—Paper 38 dated May 10, 2023—42 pages.
Declaration of Dr. Dean Neikirk U.S. Pat. No. 11,297,705 PGR2023-00016—*Home Depot U.S.A., Inc. v. Lynk Labs, Inc.*—Part 1 87 Pages—Ex. 1002.
Declaration of Dr. Dean Neikirk U.S. Pat. No. 11,297,705 PGR2023-00016—*Home Depot U.S.A., Inc. v. Lynk Labs, Inc.*—Part 2 89 Pages—Ex. 1002.
IEEE 100 The Authoritative Dictionary of IEEE Standards Terms; Seventh Edition—PGR2023-00016 Home Depot 3 pages—Ex. 1028.
*Home Depot U.S.A., Inc., v. Lynk Labs, Inc.* IPR2021-01370 U.S. Pat. No. 10,349,479 B2 Decision, Final Written Decision Determining All Challenged Claims Unpatentable 35 U.S.C. Section 318 (a) entered Jan. 18, 2023.
*Home Depot U.S.A., Inc., v. Lynk Labs, Inc.* U.S. Pat. No. 11,297,705 Filing Date Feb. 22, 2021 Issue Date Apr. 5, 2022—PGR2023-00016, Petition for Post-Grant Review of U.S. Pat. No. 11,297,705 dated Jan. 5, 2023—Part 1.
*Home Depot U.S.A., Inc., v. Lynk Labs, Inc.* U.S. Pat. No. 11,297,705 Filing Date Feb. 22, 2021 Issue Date Apr. 5, 2022—PGR2023-00016, Petition for Post-Grant Review of U.S. Pat. No. 11,297,705 dated Jan. 5, 2023—Part 2.
Adel S. Sedra and Kenneth C. Smith, Microelectronic Circuits, Oxford University Press, Fourth Edition, 1998, pp. 1-220.
Peter Walker (editor), Dictionary of Science and Technology, Chambers, 1999, 4 pages.
Dictionary of Scientific and Technical Terms, McGraw Hill, Sixth Edition, 2003, 4 pages.
Tim Williams, The Circuit Designer's Companion, First Edition, Butter worth Heinemann, 1991, 314 pages.

\* cited by examiner

LED CIRCUITS AND ASSEMBLIES

PRIORITY CLAIM

This application is a continuation of U.S. patent application Ser. No. 17/728,516, filed Apr. 25, 2022, now U.S. Pat. No. 11,729,884, which is a continuation of U.S. patent application Ser. No. 17/233,891, filed Apr. 19, 2021, now U.S. Pat. No. 11,317,495, which is a continuation of U.S. patent application Ser. No. 15/334,001, filed Oct. 25, 2016, now U.S. Pat. No. 10,986,714, which is a continuation-in-part of U.S. patent application Ser. No. 14/172,644, filed Feb. 4, 2014, now U.S. Pat. No. 9,750,098, which is a continuation of U.S. patent application Ser. No. 13/322,796, filed Nov. 28, 2011, now U.S. Pat. No. 8,648,539, which is a national phase application of International Application No. PCT/US2010/001597, filed May 28, 2010, which claims priority to U.S. Provisional Application No. 61/217,215, filed May 28, 2009, and is a continuation-in-part of U.S. patent application Ser. No. 12/287,267, filed Oct. 6, 2008, now U.S. Pat. No. 8,179,055, which claims the priority to U.S. Provisional Application No. 60/997,771, filed Oct. 6, 2007; the contents of each of these applications are expressly incorporated herein by reference.

TECHNICAL FIELD

The present invention relates generally to light-emitting diode ("LED") circuits and assemblies; and more specifically to scalable alternating current ("AC") driven LED circuits and assemblies.

SUMMARY

While not intending to limit the scope of the claims or disclosure, in brief summary, the present disclosure and claims are directed to providing improved ease of designing and building lighting fixtures using AC-driven LEDs. Disclosed and claimed are LED circuits having scalable circuit configurations and LED package assembly configurations which can be used in an AC-drive platform to more easily match the voltage requirements of the lighting fixture(s) or systems in which the LED's are desired. Circuits and LED package assemblies are claimed and disclosed which reduce objectionable flicker produced from AC-driven LEDs and to produce more light per component. Packaged LED's are provided for lighting design according to the invention, which address flicker at low frequencies (e.g. 50/60 Hz) while being scalable as desired for a particular lighting goal without resort to designing individual assemblies at the semiconductor die level. Circuits are also disclosed and claimed which provide for some of the LEDs in a circuit to be on during both positive and negative phases of an AC source, to among other things, address flicker. Also, circuits are claimed and disclosed where a basic circuit design provides a voltage and current performance whereby scalability or matching a particular voltage requirement is achieved by configuring LEDs in the basic design and/or by joining one or more of the basic circuits together in series or parallel to achieve the design requirement.

According to an embodiment of the invention, an AC-driven LED circuit is proposed having a first parallel circuit having LEDs. Each LED has an input and an output, and the circuit having at least first and second branches connecting at first and second common points, the common points providing input and output for an AC driving current for the circuit. The first branch having a first and a second LED, and the second branch having a third and a fourth LED. The first LED is connected to the second LED in opposing series relationship with the inputs of the first and second LEDs defining a first branch junction. The third LED is connected to the fourth LED in opposing series with the outputs of the third and fourth LEDs defining a second branch junction. The first and second branches are connected to one another such that the output of the first LED is connected to the input of the third LED at the first common point and the output of the second LED is connected to the input of the fourth LED at the second common point. A first cross-connecting circuit branch having at least a fifth LED, the first cross-connecting circuit being configured such that the input of the fifth LED is connected to second branch junction and the output is connected to the first branch junction.

According to another embodiment of the invention, an AC-driven LED circuit may comprise one or more additional parallel circuits each being the same as the first parallel circuit identified above. Each additional circuit being conductively connected to the first parallel circuit and to one another at their common points for providing an input and an output for an AC driving current of the circuit. According to other embodiments, the additional parallel circuits may be connected in series to the first parallel circuit and to one another or the additional parallel circuits may be connected in parallel to the first parallel circuit and to one another.

According to another embodiment of the invention, n additional LEDs, in pairs, may be provided in the circuit wherein the pairs are configured among the first and second branch circuits of each of the respective parallel circuits, such that current flows through the respective fifth diode of each parallel circuit upon both a negative and positive phase of the AC driving source and so that the current draw through each of the respective parallel circuits during both AC phases is substantially the same.

According to another embodiment, the AC-driven LED circuit further comprises x cross-connecting circuit branches each having one or more LEDs and being configured such that current flows through each of the respective one or more LEDS upon both a negative and positive phase of the AC driving source and so that the current draw through each of the respective parallel circuits during both AC phases is substantially the same.

According to another embodiment of the invention, an AC-driven LED assembly comprises at least a first and a second LED each discretely packaged, the LEDs being connected in an AC circuit and each LED package being mounted to a substrate at a distance from the other of preferably approximately 3 mm or less, and more preferably 2.0 mm or less. In an embodiment the packaged LEDs also each have a length of preferably approximately 2.5 mm or less, and more preferably 2.0 mm or less. In an embodiment the packaged LEDs also each have a width of preferably approximately 2.5 mm or less, and more preferably 2.0 mm or less. In an embodiment the LED packages are arranged with respect to each other in a linear spatial relationship while in another embodiment the LED packages are arranged with respect to each other in an XY rectilinear spatial relationship. In an embodiment of the invention, one or more LED packages may include a reflective material.

DETAILED DESCRIPTION

While this invention is susceptible to embodiments in many different forms, there are shown in the drawings and will herein be described in detail, preferred embodiments of the invention with the understanding that the present disclosures are to be considered as exemplifications of the principles of the invention and are not intended to limit the broad aspects of the invention to the embodiments illustrated. Like components in the various FIGS. will be given like reference numbers.

Figures 1, 2, 3, 4:
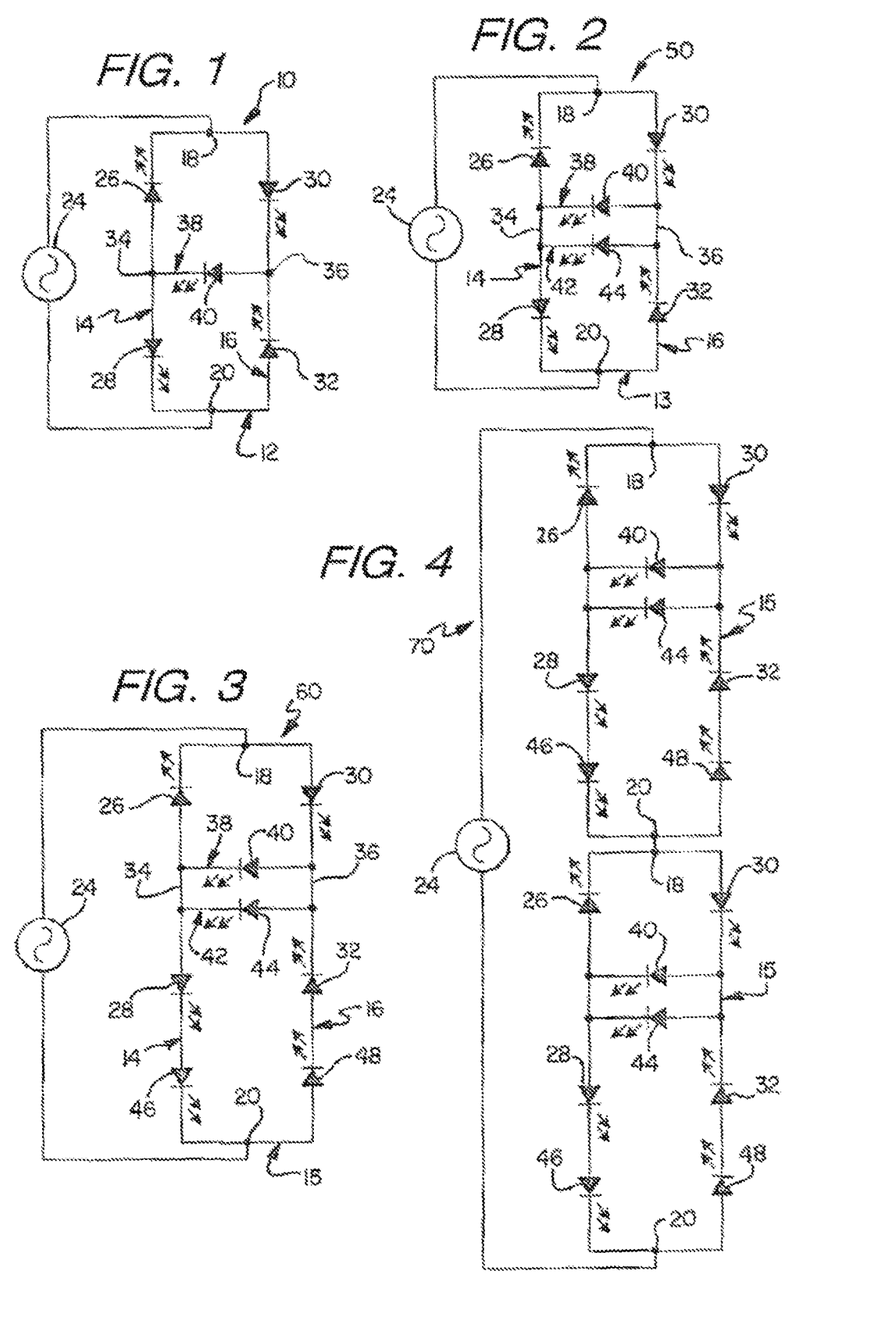
FIG. 1 is a schematic view of an AC-driven LED circuit, according to an embodiment of the invention.
FIG. 2 is a schematic view of an AC-driven LED circuit, according to an embodiment of the invention.
FIG. 3 is a schematic view of an AC-driven LED circuit, according to an embodiment of the invention.
FIG. 4 is a schematic view of an AC-driven LED circuit, according to an embodiment of the invention.

FIG. 1 discloses an AC-driven LED circuit 10 including a first parallel circuit 12 having a first branch 14, and a second branch 16. Branches 14, 16 connect at first common point 18 and second common point 20. The common points 18, 20 provide input and output for an AC driving current from a driver 24 for the circuit. The driver may be, for example, mains power, an electronic transformer, or a magnetic transformer.

The first branch 14 has a first LED 26 and a second LED 28, and the second branch 16 having a third LED 30 and a fourth LED 32. The first LED 26 is connected to the second LED 28 in opposing series relationship with the inputs of the first and second LEDs 26, 28 defining a first branch junction 34. The third LED 30 is connected to the fourth LED 32 in opposing series with the outputs of the third and fourth LEDs 30, 32 defining a second branch junction 36.

The first and second branches 14, 16 are connected to one another such that the output of the first LED 26 is connected to the input of the third LED 30 at the first common point 18 and the output of the second LED 28 is connected to the input of the fourth LED 32 at the second common point 20. A first cross-connecting circuit branch 38 has a fifth LED 40. The first cross-connecting circuit branch 38 being configured such that the input of the fifth LED 40 is connected to second branch junction 36 and the output is connected to the first branch junction 34.

As will be appreciated by those of skill in the art, the LEDs 26 and 32 provide light only upon one half of an AC wave, pulse or phase, while the LEDs 28 and 30 will provide light only upon the opposite wave, pulse or phase. At lower frequencies, e.g. mains frequencies, if the LEDs are spaced pursuant to another aspect of the invention (disclosed below) at preferably approximately 3.0 mm or less preferably approximately 2.0 mm or less, then the amount of noticeable flicker may not be unacceptable. However, the cross connecting circuit 38 and diode 40 will be on (produce light) in both phases of the AC drive and hence mitigate flicker which may be evidenced in its surrounding LEDs 26, 28, 30 and 32.

Figure 9:
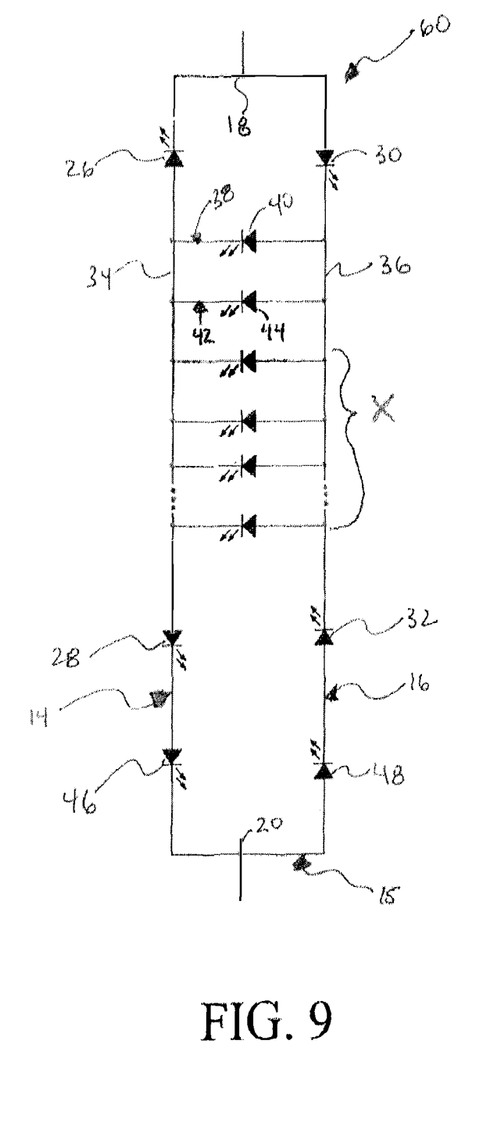
FIG. 9 is a schematic view of an AC-driven LED circuit, according to an embodiment of the invention.

FIG. 2 discloses an AC-driven LED circuit 50 which is a modification of AC-driven LED circuit 10. Circuit 50 further mitigates flicker. Circuit 50 provides an additional cross-connecting circuit branch 42 having LED 44. The LEDS 40, 44 are configured such that current flows through each upon both a negative and positive phase of the AC driving source 24. It should be appreciated that according to the invention x number of such cross connecting circuit branches (such as 38, 42) may be added as desired (see for example FIG. 9), however, since the LEDs (such as LEDs 40, 44) are in parallel with each other, their voltage demand will be divided while their current draw will not. Hence a suitable driver need be provided for this circumstance.

Figure 10:
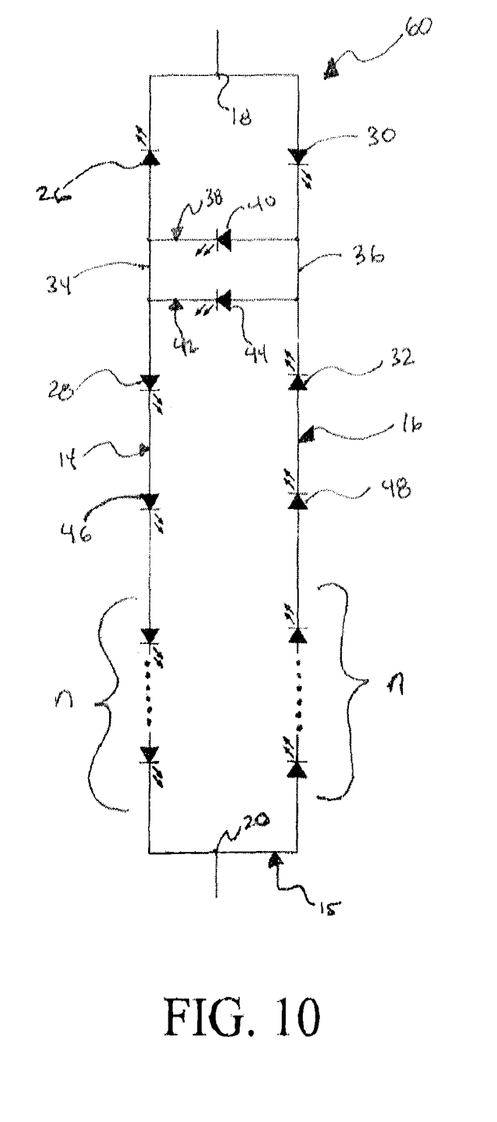
FIG. 10 is a schematic view of an AC-driven LED circuit, according to an embodiment of the invention.

To increase the light output of the circuit of the invention, it should be noted as disclosed in FIGS. 3 and 10 that additional or n LEDS may be provided in the branches 14 and 16. Specifically FIG. 3 discloses an AC-driven circuit 60 which is a modification of circuit 50. Circuit 60 provides for additional LEDs 46 and 48. The pair of LEDs are configured among the first and second branch circuits 14, 16 of the parallel circuit 15 such that current flows through the respective diodes 40, 44 upon both a negative and positive phase of the AC driving source 24 and so that the current draw through parallel circuit 15 during both AC phases is substantially the same.

It should be noted that according to the invention, n pairs of LEDs can be configured among first and second branch circuits of a respective parallel circuit (see for e.g., FIG. 10), such that current flows through the respective cross connecting circuit branch LEDs of a parallel circuit upon both a negative and positive phase of the AC driving source and so that the current draw through each of the respective parallel circuits during both AC phases is substantially the same. More LEDs in the branch circuits divide the current from the higher current LEDs in cross connecting circuits 38, 42.

According to another aspect of the invention, to further mitigate the amount of flicker perceived, adding to the light provided and to scalability, additional parallel circuits, each being the same as the first parallel circuit, may be conductively connected to the first parallel circuit in series or parallel at the their common points 18, 20 for providing an input and an output for an AC driving current for the circuit.

Figure 5:
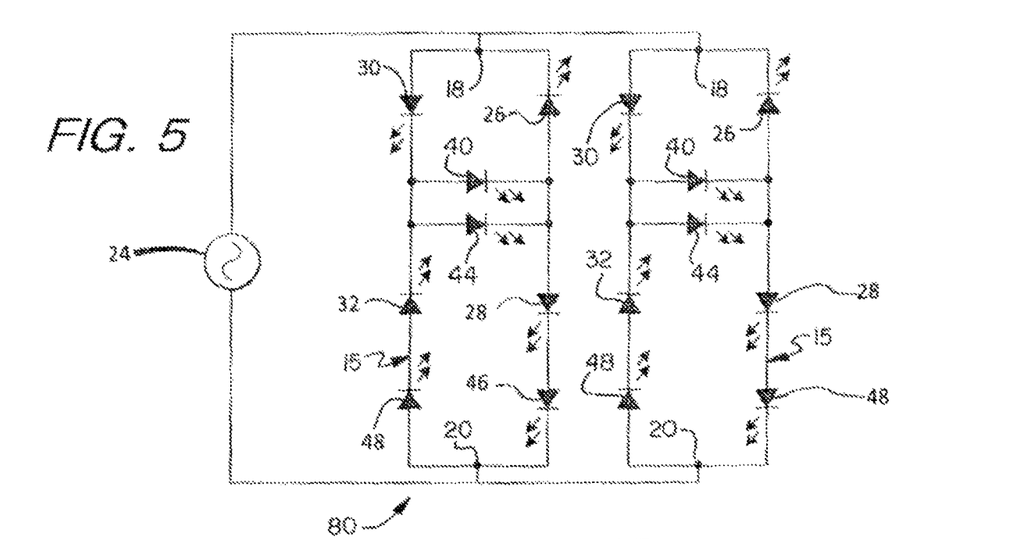
FIG. 5 is a schematic view of an AC-driven LED circuit, according to an embodiment of the invention.

For instance, FIG. 4 discloses an AC-driven LED circuit 70 which includes additional parallel circuits 15 connected in series at common points 18, 20. Additionally, as seen in FIG. 5, an AC-driven LED circuit 80 includes additional parallel circuits 15 connected in parallel at common points 18, 20. This embodiment shows the utility of providing a scalable circuit that can be manufactured modularly and used to connect to match higher voltage requirements e.g. circuit 15 may draw drawing 12 V AC while two such circuits 15 in series would meet 24 V AC requirements.

Preferably, the number and type of LEDs in the AC-driven LED circuit draws a combined current and combined voltage which is substantially equal to the nominal voltage capacity of the AC drive source.

Figure 6:
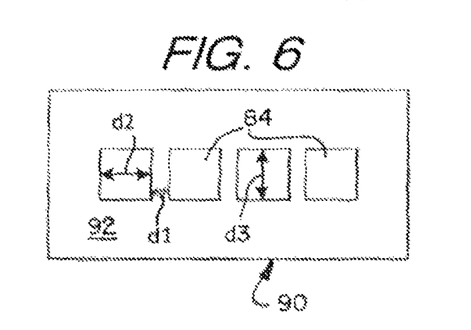
FIG. 6 is a schematic top view of an AC-driven LED assembly, according to an embodiment of the invention.

As shown in FIG. 6, an AC-driven LED assembly 90 has a first and a second LED 82 each discretely packaged, the LEDs being connected in an AC circuit and each LED package 82 being mounted to a substrate 92 at a distance d1 from the other of preferably approximately 3 mm or less, and more preferably 2.0 mm or less. The first and second LEDs may be, for example, discrete packaged semiconductor LED die or LED chips. The AC-driven LED assembly 90 also has packaged LEDs 84 each having a width d2 and a length d3 of preferably approximately 2.5 mm or less, and more preferably 2.0 mm or less.

Figure 7:
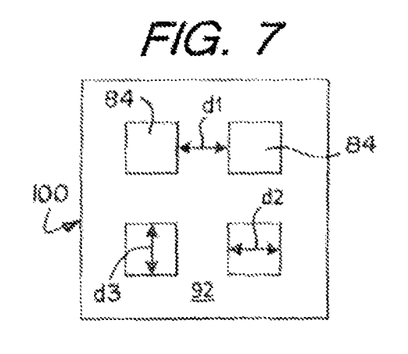
FIG. 7 is a schematic top view of an AC-driven LED assembly, according to an embodiment of the invention.

FIG. 6 discloses an AC-driven LED assembly 90 wherein the LED packages 84 are arranged with respect to each other in a linear spatial relationship, while FIG. 7 discloses an assembly 100 wherein the LED packages 84 are arranged with respect to each other in an XY rectilinear spatial relationship.

Figure 8:
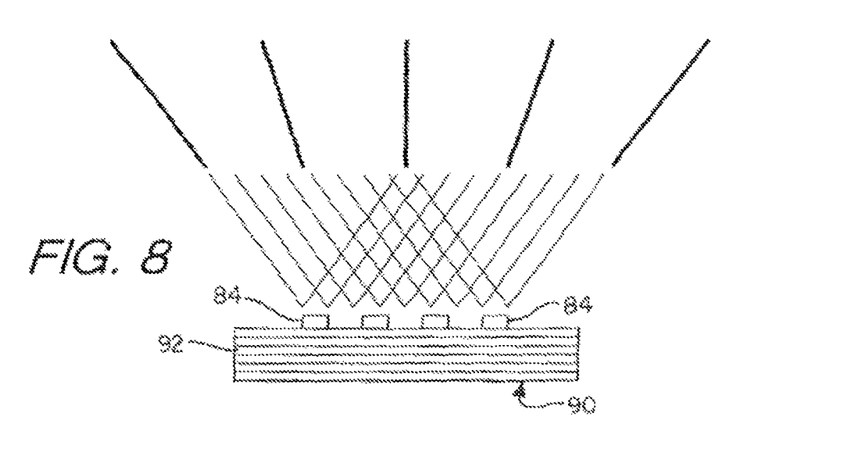
FIG. 8 is a schematic side view of an AC-driven LED assembly, according to an embodiment of the invention.

As can be seen in FIG. 8, when LED packages 84 are placed at 3 mm or less, the light produced there from intersects, thereby reducing or eliminating the effects of flicker.

Some standard AC voltages in the world include 12 VAC, 24 VAC, 100 VAC, 110 VAC, 120 VAC, 220 VAC, 230 VAC, 240 VAC and 277 VAC. Therefore, it would be advantageous to have a single chip LED or multi-chip single LED packages that could be easily configured to operate at multiple voltages by simply selecting a voltage and/or current level when packaging the multi-voltage and/or multi-current single chip LEDs or by selecting a specific voltage and/or current level when integrating the LED package onto a printed circuit board or within a finished lighting product. It would also be advantageous to have multi-current LED chips and/or packages for LED lamp applications in order to provide a means of increasing brightness in LED lamps by switching in additional circuits just as additional filaments are switched in for standard incandescent lamps.

It would further be advantageous to provide multiple voltage level and/or multiple brightness level light emitting LED circuits, chips, packages and lamps "multi-voltage and/or multi-brightness LED devices" that can easily be electrically configured for at least two forward voltage drive levels with direct AC voltage coupling, bridge rectified AC voltage coupling or constant voltage DC power source coupling. This invention comprises circuits and devices that can be driven with more than one AC or DC forward voltage "multi-voltage" at 6V or greater based on a selectable desired operating voltage level that is achieved by electrically connecting the LED circuits in a series or parallel circuit configuration and/or more than one level of brightness "multi-brightness" based on a switching means that connects and/or disconnects at least one additional LED circuit to and/or from a first LED circuit. The desired operating voltage level and/or the desired brightness level electrical connection may be achieved and/or completed at the LED packaging level when the multi-voltage and/or multi-brightness, circuits and/or single chips are integrated into the LED package, or the LED package may have external electrical contacts that match the integrated multi-voltage and/or multi-brightness circuits and/or single chips within, thus allowing the drive voltage level and/or the brightness level select-ability to be passed on through to the exterior of the LED package and allowing the voltage level or brightness level to be selected at the LED package user, or the PCB assembly facility, or the end product manufacturer.

It would further be advantageous to provide multi-brightness LED devices that can be switched to different levels of brightness by simply switching additional circuits on or off in addition to a first operating circuit within a single chip and or LED package. This would allow LED lamps to switch to higher brightness levels just like 2-way or 3-way incandescent lamps do today.

According to another aspect of the invention a multi-voltage and/or multi-current single chip AC LED and/or multi-voltage and/or multi-current AC LED package is integrated within an LED lamp. The LED lamp having a structure that comprises a heat sink, a lens cover and a standard lamp electrical base. The multi-voltage and/or multi-current single chip AC LED and/or package is configured to provide a means of switching on at least one additional single voltage AC LED circuit within multi-voltage and/or multi-current AC LED circuit to provide increased brightness from the LED lamp.

According to another aspect of the invention, at least one single chip multi-current LED bridge circuit is integrated within a LED lamp having a standard lamp base. The single chip multi-current LED bridge circuit may be electrically connected together in parallel configuration but left open to accommodate switching on a switch to the more than one on the single chip and have at least one accessible electrical contact at each opposing end of the two series connected circuits and one accessible electrical contact at the center junction of the at least two individual serially connected LED circuits. The at least two individual circuits are integrated within a single chip.

Figure 11:
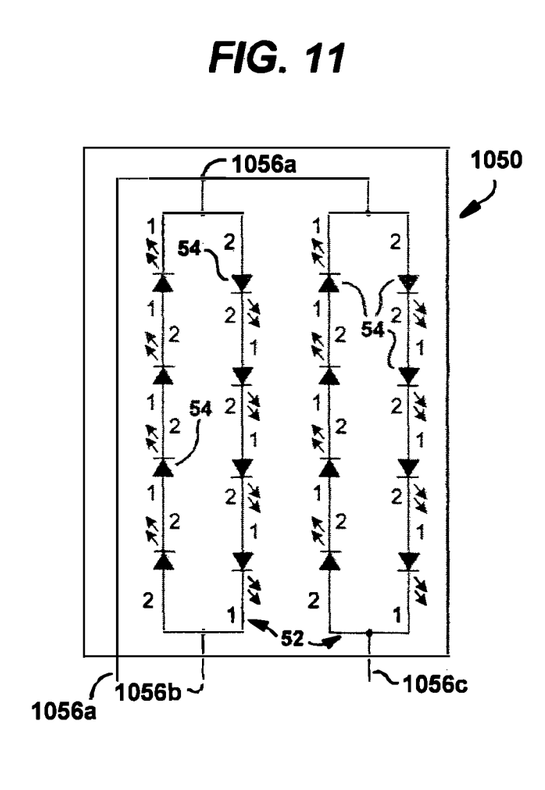
FIG. 11 is a schematic view of a multi-voltage and/or multi-brightness LED lighting device according to an embodiment of the invention.

FIG. 11 discloses a schematic diagram of a multi-voltage and/or multi-brightness LED lighting device 1050. The multi-voltage and/or multi-brightness LED lighting device 1050 comprises at least two AC LED circuits 1052, each of which have at least two LEDs 1054 in series and anti-parallel relation. The at leak two AC LED circuits 1052 have at least three electrical contacts 1056 a, 1056 b and 1056 c. The at least two AC LED circuits 1052 are electrically connected together in parallel at one end 1056 a and left unconnected at the opposing ends of the electrical contacts 1056 b and 1056 c. One side of an AC voltage source line is electrically connected to 1056 a and the other side of an AC voltage source line is individually electrically connected to 1056 b and 1056 c with either a fixed connection or a switched connection thereby providing a first brightness when AC voltage is applied to 1056 a and 1056 b and a second brightness when an AC voltage is applied to 1056 a, 1056 b and 1056 c. It is contemplated that the multi-voltage and/or multi-brightness LED lighting device 1050 is a single chip, an LED package, an LED assembly or an LED lamp. The multi-brightness switching capability.

Figure 12:
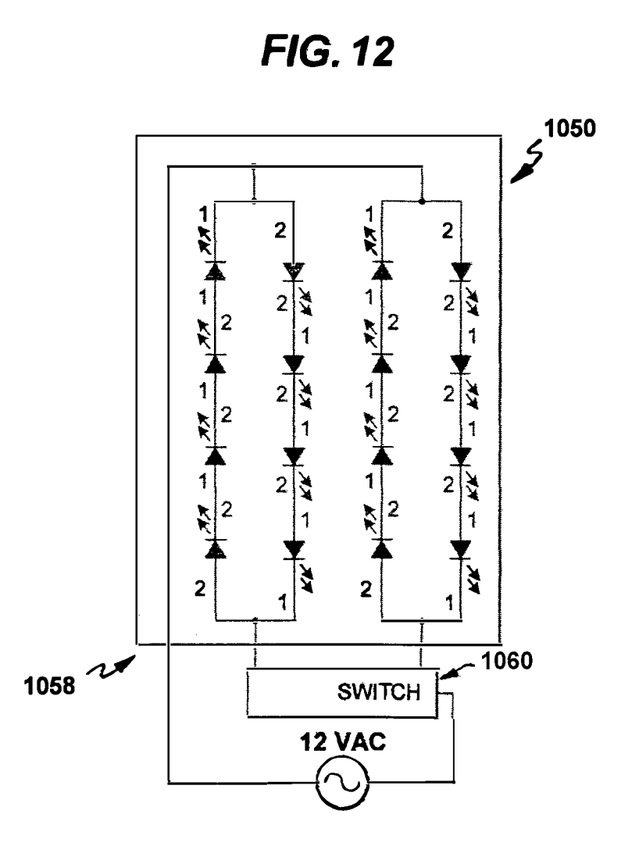
FIG. 12 is a schematic view of a multi-voltage and/or multi-brightness LED lighting device integrated within a lamp according to an embodiment of the invention.

FIG. 12 discloses a schematic diagram similar to the multi-voltage and/or multi-brightness LED device 1050 shown in FIG. 11 integrated within a lamp 1058 and connected to a switch 1060 to control the brightness level of the multi-voltage and/or multi-brightness LED lighting device 1050.

Figure 13:
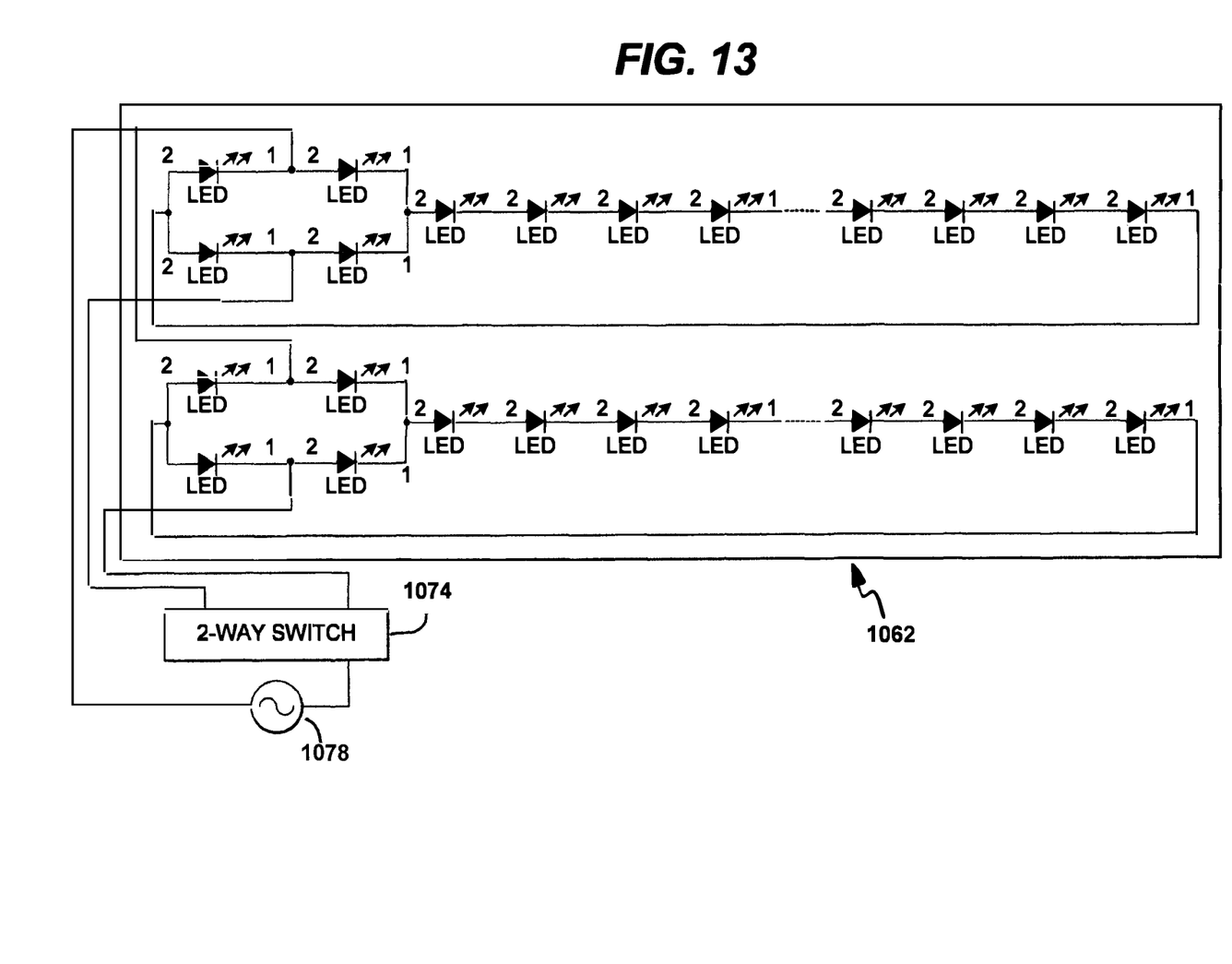
FIG. 13 is a schematic view of a multi-voltage and/or multi-brightness LED lighting device with a switch connected to an AC voltage source, according to an embodiment of the invention.

FIG. 13 discloses a schematic diagram the multi-brightness LED lighting device 1062 with a switch 1074 electrically connected between the multi-brightness LED lighting device 1062 and the AC voltage source 1078.

FIG. 13 discloses a schematic diagram of at least two single voltage LED circuits integrated with a single chip or within a substrate and forming a multi-voltage and/or multi-brightness LED device.

A package in certain applications may preferably also include a heat sink, a reflective material, a lens for directing light, phosphor, nano-chrystals or other light changing or enhancing substances. In some embodiments, an LED circuit includes at least two LEDs. At least one of the at least two LEDs includes a different phosphor coating than that of at least one other LED of the at least two LEDs. In sum, according to one aspect of the invention, the LED circuits and AC drivers of the present invention permit pre-packaging of the LED portion of a lighting system to be used with standardized drivers of known specified voltage and frequency output. Such packages can be of varied make up and can be combined with each other to create desired systems given the scalable and compatible arrangements possible with, and resulting from, the invention.

According to an aspect of the invention, an LED circuit driver provides a relatively fixed voltage and relatively fixed frequency AC output such as mains power sources. The LED circuit driver output voltage and frequency delivered to the LED circuit may be higher or lower than mains power voltage and frequencies by using an LED circuit inverter driver.

The higher frequency LED circuit Inverter driver may be an electronic transformer, halogen or high intensity discharge (HID) lamp type driver with design modifications for providing a relatively fixed voltage as the LED circuit load changes. Meaning if the LED circuit inverter driver is designed to have an output voltage of 12V LED circuit driver would provide this output as a relatively constant output to a load having one or more than one LED circuits up to the wattage limit of the LED circuit driver even if LED circuits were added to or removed from the output of the LED circuit driver.

As would be known to one skilled in the art, various embodiments of the LED packages, substrates, and assemblies may be produced, such as creating an AC-driven circuit where all circuits and LEDs are formed on a semiconductor, where the LED are discretely packaged apart from the circuits, and where each parallel circuit is formed on a printed circuit board.

While in the preceding there has been set forth a preferred embodiment of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying Claims.

The invention is claimed as follows:

1. An LED lighting device comprising:
   a first LED circuit and at least one additional LED circuit, wherein the first LED circuit and the at least one additional LED circuit each includes LEDs connected in series, and wherein the LEDs in the first LED circuit emit a different color of light than the LEDs in the at least one additional LED circuit; and
   a switch configured to be actuated between different positions by an end user and provide the end user with (i) a first position for selecting at least one of a different level of voltage or current to be input to at least one of the first LED circuit and the at least one additional LED circuit to produce a change in brightness of the at least one of the first LED circuit and the at least one additional LED circuit, and (ii) a second position for selectively switching at least one of the first LED circuit and the at least one additional LED circuit on or off when the end user actuates the switch,
   wherein the switch is integrated within the LED lighting device such that the switch is positioned to enable actuation by the end user, and
   wherein the LED lighting device is configured to be electrically connected to and powered with a mains power source.

2. The LED lighting device of claim 1, further comprising a lighting device package, wherein the lighting device package includes wire leads for electrical connection of the LED lighting device to the mains power source.

3. The LED lighting device of claim 1, further comprising at least one LED driver circuit configured to receive a high voltage input from the mains power source and provide a lower voltage DC output to at least one of the first LED circuit or the at least one additional LED circuit.

4. The LED lighting device of claim 1, wherein the first LED circuit and the at least one additional LED circuit are driven with two different DC voltage levels when the end user selects between the different positions of the switch.

5. The LED lighting device of claim 1, further comprising a driver configured to provide a voltage and a current to only one of the first LED circuit or the at least one additional LED circuit when the end user actuates the switch.

6. The LED lighting device of claim 1, further comprising a PCB substrate, wherein at least one LED from the first LED circuit and at least one LED from the at least one additional LED circuit are mounted on the PCB substrate and separated from each other by a distance of 3 millimeters ("mm") or less.

7. The LED lighting device of claim 1, further comprising at least one LED driver circuit configured to receive a bridge rectified high voltage input from the mains power source and provide a DC voltage output to at least one of the first LED circuit and the at least one additional LED circuit.

8. The LED lighting device of claim 1, wherein the switch is mounted on a printed circuit board with the first LED circuit and the at least one additional LED circuit.

9. An LED lighting device comprising:
   a first LED circuit and at least one additional LED circuit, wherein the first LED circuit and the at least one additional LED circuit each includes LEDs, and wherein the LEDs in the first LED circuit emit a different color of light than the LEDs in the at least one additional LED circuit; and
   a switch configured to be actuated between different positions by an end user and provide the end user with a first position for selecting at least one of a different level of voltage or current to be input to at least one of the first LED circuit and the at least one additional LED circuit to produce a change in brightness of the at least one of the first LED circuit and the at least one additional LED circuit,
   wherein the switch is integrated within the LED lighting device such that the switch is positioned to enable actuation by the end user, and
   wherein the LED lighting device is configured to be electrically connected to and powered by a mains power source.

10. The LED lighting device of claim 9, further comprising a lighting device package that includes wire leads for electrical connection of the LED lighting device to the mains power source.

11. The LED lighting device of claim 9, further comprising at least one LED driver circuit configured to receive a high voltage input from the mains power source and provide a lower voltage DC output to at least one of the first LED circuit or the at least one additional LED circuit.

12. The LED lighting device of claim 9, further comprising a driver configured to provide a voltage and a current to only one of the first LED circuit or the at least one additional LED circuit when the end user actuates the switch.

13. The LED lighting device of claim 9, further comprising at least one LED driver circuit configured to receive a bridge rectified high voltage input from the mains power source and provide a DC voltage output to at least one of the first LED circuit and the at least one additional LED circuit.

14. The LED lighting device of claim 9, wherein the first LED circuit and the at least one additional LED circuit are driven with two different DC voltage levels when the end user selects between the different positions of the switch.

15. The LED lighting device of claim 9, further comprising a PCB substrate, wherein at least one LED from the first LED circuit and at least one LED from the at least one additional LED circuit are mounted on the PCB substrate and separated from each other by a distance of 3 millimeters ("mm") or less.

16. The LED lighting device of claim 9, wherein the switch is mounted on a printed circuit board with the first LED circuit and the at least one additional LED circuit.

\* \* \* \* \*